United States Patent
Gründl et al.

(10) Patent No.: US 7,637,333 B2
(45) Date of Patent: Dec. 29, 2009

(54) HYBRID DRIVING SYSTEM FOR A MOTOR VEHICLE

(75) Inventors: Andreas Gründl, München (DE);
Bernhard Hoffmann, Starnberg (DE);
Reinhard Rasch, Hechendorf (DE);
Friedrich Mörtl, Gemünden am Main (DE); Hans Glonner, Pfaffenhofen (DE); Georg Götz, Steinkirchen (DE);
Jörg Michael, Ingolstadt (DE); Markus Kaindl, Rohrbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 675 days.

(21) Appl. No.: 10/531,371

(22) PCT Filed: Oct. 14, 2003

(86) PCT No.: PCT/EP03/11370

§ 371 (c)(1),
(2), (4) Date: Aug. 17, 2005

(87) PCT Pub. No.: WO2004/037594

PCT Pub. Date: May 6, 2004

(65) Prior Publication Data

US 2006/0096795 A1      May 11, 2006

(30) Foreign Application Priority Data

Oct. 18, 2002   (DE)   ................. 102 48 715

(51) Int. Cl.
*B60L 11/00* (2006.01)
(52) U.S. Cl. ................. 180/65.22; 180/65.25; 318/112; 903/906
(58) Field of Classification Search ................. 180/65.2, 180/65.3, 65.4; 318/112; 903/906
See application file for complete search history.

(56) References Cited

U.S. PATENT DOCUMENTS

| 2,414,532 A | 1/1947 | Johns et al. |
| 4,309,620 A | 1/1982 | Bock |
| 4,739,204 A | 4/1988 | Kitamura et al. |

(Continued)

FOREIGN PATENT DOCUMENTS

CH      331336      8/1958

(Continued)

OTHER PUBLICATIONS

Forms, PCT/ISA/210, 220 International Search Report for PCT/EP03/11370, Jan. 7, 2004.

*Primary Examiner*—Jeffrey J Restifo
(74) *Attorney, Agent, or Firm*—Wood, Herron & Evans, L.L.P.

(57) ABSTRACT

Hybrid drive for a motor vehicle with a drive train, comprising a combustion engine and a vehicle transmission with variable gear ratio and a first and second electrical machine which can be operated both as a motor and a generator, each of which comprises a stator and a rotor with the second electrical machine being in a permanent nonpositive connection with an input of the vehicle transmission, with a shiftable clutch each being arranged between the electrical machines and the drive shaft of the combustion engine, and with the electrical machines to be connected with each other and/or an electrical energy source via an electronic control circuit. The two electrical machines are to be arranged in a common housing, and one of the stators of the electrical machines together with the electronic control circuit and/or the other stator is accommodated on a common carrier.

16 Claims, 2 Drawing Sheets

U.S. PATENT DOCUMENTS

| | | | |
|---|---|---|---|
| 5,670,838 A * | 9/1997 | Everton ................... 310/254 |
| 5,678,646 A * | 10/1997 | Fliege ..................... 180/65.1 |
| 5,731,643 A * | 3/1998 | Avakian et al. ............. 310/53 |
| 5,833,022 A * | 11/1998 | Welke ..................... 180/65.2 |
| 5,845,731 A | 12/1998 | Buglione et al. |
| 5,904,631 A * | 5/1999 | Morisawa et al. ............. 475/5 |
| 5,935,035 A | 8/1999 | Schmidt |
| 5,973,460 A * | 10/1999 | Taga et al. ................ 318/139 |
| 6,201,365 B1 | 3/2001 | Hara et al. |
| 6,520,879 B2 * | 2/2003 | Kawabata et al. ............. 475/5 |
| 6,527,659 B1 * | 3/2003 | Klemen et al. ............... 475/5 |
| 6,579,202 B2 * | 6/2003 | El-Antably et al. ......... 475/159 |
| 6,661,109 B2 * | 12/2003 | Fukasaku et al. ......... 290/40 C |
| RE38,790 E * | 9/2005 | Maeda et al. ............ 290/40 C |
| 6,945,894 B2 * | 9/2005 | Holmes ..................... 475/5 |
| 7,002,267 B2 * | 2/2006 | Raszkowski et al. .......... 310/54 |
| RE39,205 E * | 7/2006 | Sasaki ..................... 318/150 |
| 7,174,978 B2 * | 2/2007 | Taniguchi et al. .......... 180/65.1 |
| 7,211,913 B2 * | 5/2007 | Tsutsui et al. .............. 310/54 |
| 7,239,033 B2 * | 7/2007 | Motoike et al. ........... 290/40 C |
| 7,284,313 B2 * | 10/2007 | Raszkowski et al. .......... 29/596 |
| 7,393,296 B2 * | 7/2008 | Kano et al. ................. 475/5 |
| 7,426,971 B2 * | 9/2008 | Kano et al. ............... 180/65.2 |
| 2001/0024997 A1 * | 9/2001 | Sugano et al. ................ 477/2 |
| 2003/0102174 A1 * | 6/2003 | Bordini ................... 180/65.2 |
| 2003/0173840 A1 * | 9/2003 | Seniawski et al. ............. 310/54 |
| 2003/0226653 A1 * | 12/2003 | Takedomi et al. ............. 165/43 |
| 2004/0124722 A1 * | 7/2004 | Uchida et al. ................ 310/54 |
| 2004/0154846 A1 * | 8/2004 | Kira ...................... 180/65.6 |
| 2004/0226761 A1 * | 11/2004 | Takenaka et al. .......... 180/65.1 |
| 2006/0027192 A1 * | 2/2006 | Tsukada et al. ............. 123/41.7 |
| 2008/0103003 A1 * | 5/2008 | Sah et al. ..................... 475/5 |
| 2008/0184706 A1 * | 8/2008 | Uno et al. ..................... 60/667 |

FOREIGN PATENT DOCUMENTS

| | | |
|---|---|---|
| DE | 3231960 A1 | 3/1984 |
| DE | 4230510 C1 | 9/1993 |
| DE | 4411055 | 8/1995 |
| DE | 19916489 | 10/2000 |
| DE | 19917295 A1 | 10/2000 |
| DE | 10007505 | 8/2001 |
| DE | 10154147 C1 | 7/2003 |
| EP | 1102385 A2 | 5/2001 |
| EP | 1215418 A1 | 6/2002 |
| FR | 2881267 | 1/2002 |
| JP | 02055551 | 2/1990 |
| JP | 06144020 | 5/1994 |
| JP | 10309003 | 11/1998 |
| JP | 11217025 | 8/1999 |
| WO | 98/28833 | 7/1998 |

* cited by examiner

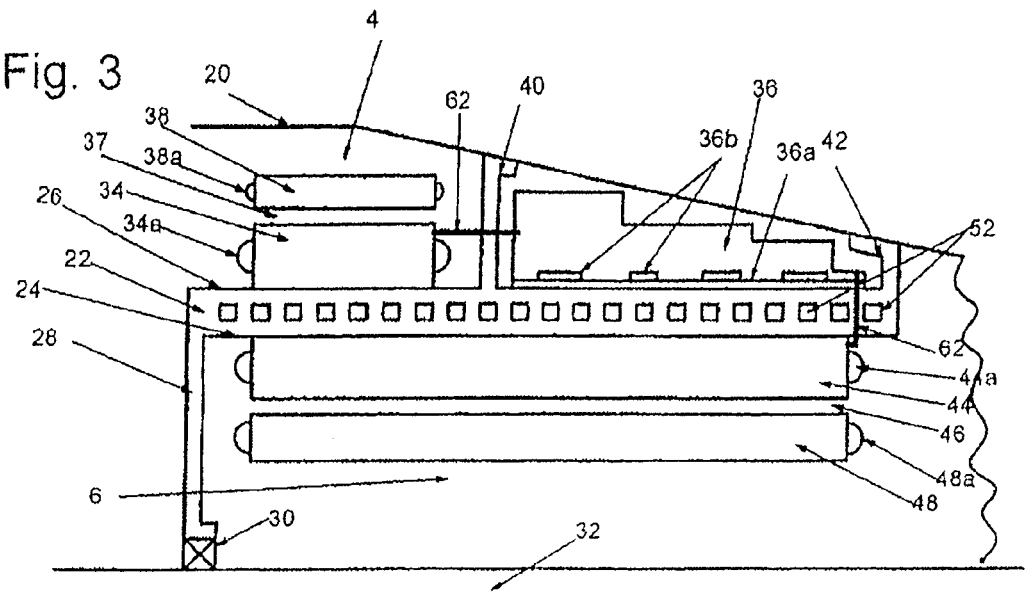
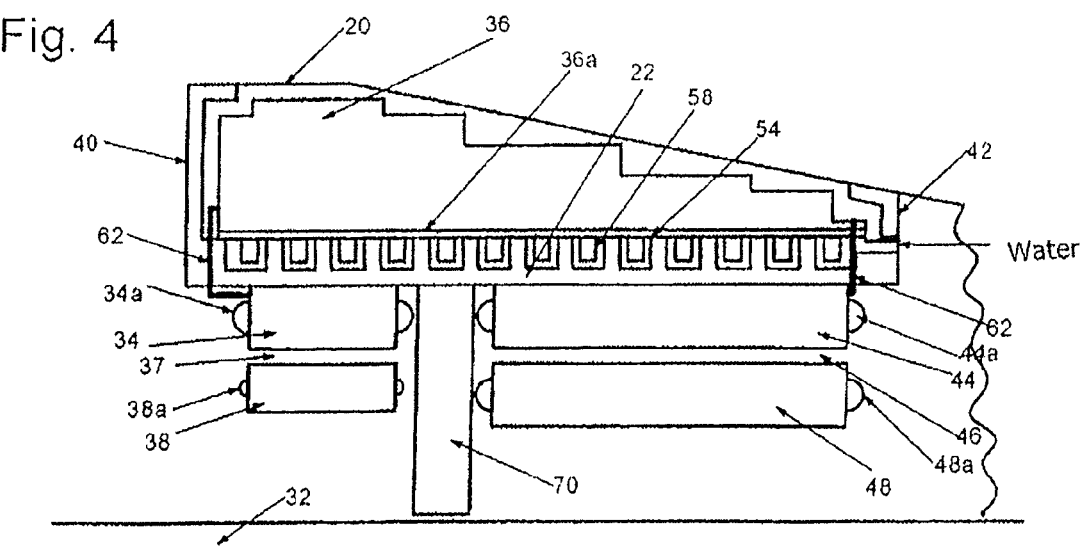

HYBRID DRIVING SYSTEM FOR A MOTOR VEHICLE

BACKGROUND OF THE INVENTION

The invention relates to a hybrid drive for a motor vehicle with a combustion engine and a vehicle transmission with variable gear ratio and a first and second electrical machine which can be operated both as a motor and a generator, each of which comprises a stator and a rotor, with the second electrical machine being in a permanent nonpositive connection with an input of the vehicle transmission, with a shiftable clutch each being arranged between the electrical machines and the drive shaft of the combustion engine, and with the electrical machines to be connected with each other and/or an electrical energy source via an electronic control circuit.

Electric motors as drive motors for motor vehicles, which are supplied with electric energy by a battery or an on-board fuel cell permit emission-free and nearly silent driving, while being of a compact construction. The driving performance of purely electrically driven vehicles, however, is heavily restricted, due to the limited storage capacities of currently employed batteries, which is why electrovehicles have been employed only in special areas.

Apart from purely electric drive systems, partially electric drives are known which are also referred to as "hybrid drives". These partially electrical drive systems essentially have a combustion engine as drive unit, by means of which a high performance and large cruising range of the motor vehicles are achieved. As a supplement, at least one electrical machine is arranged between the combustion engine and the transmission, which is arranged in series with or parallel to the drive train (between combustion engine and transmission) and offers the advantages such as for example brake energy recovery and emission-free driving.

In so-called serial hybrid drives, travelling is effected purely electrically with limited power in one driving range, i.e. the combustion engine and one of the two electrical machines are at standstill. The entire required energy is supplied from a battery. In a second driving range, travelling is effected by means of the combustion engine which drives the second electrical machine operating as a generator which in turn supplies the energy for the driving motor in the electric mode. Such serial hybrid drives operate without clutches in a permanent non-positive connection.

In so-called parallel hybrid drives, starting is effected purely electrically by means of an electric motor which is connected with a transmission input shaft. Meanwhile, the combustion engine is at standstill, which is disengaged from the transmission input shaft by a non-positive clutch. At a higher power requirement, e. g. exceeding a certain higher travelling speed, the combustion engine is started by the closing of a clutch, with the combustion engine then serving as a prime mover. The electric motor can then be used as an additional power source or a generator for charging the vehicle battery.

Problem on which the Invention is Based

The installation space in motor vehicles, in particular in passenger cars, is very limited. An essential aspect is the simple mountability and the suitability for series production of the above described hybrid drives.

The present invention is based on the object to create a hybrid drive for a motor vehicle, which provides for safe operation, compact construction, and ease of assembly and testing.

Invention Solution

According to the invention, this object is solved by a hybrid drive in accordance with the characteristics of Claim 1. For this purpose, the two electrical machines are to be arranged in a common housing, and one of the stators of the electrical machines together with the electronic control circuit and/or the other stator are accommodated on a common carrier.

This design enables a space saving modular assembly with preceding testing of the function of the stators and their cooperation with the electronic control circuit. In addition, the common carrier may comprise a cooling means for cooling the stator(s) or the electronic control circuit, respectively.

This holds true all the more as the electrical machines, in particular when they are configured as alternating field machines, are operated by so-called frequency converters as electronic control circuit. These frequency converters include a number of half-bridge arrangements, which corresponds to the number of phases of the electrical machine, which are supplied with control signals from a actuation electronics which may also be incorporated, if required, in the electronic control circuit. Depending on whether the electrical machine is operated as a motor or a generator, the electric power is taken from a rechargeable energy source and supplied to the electrical machine either for the desired speed or the desired torque, or electric power is taken from the electrical machine and converted into the required amount or phase position for downstream loads or the rechargeable energy source, respectively. In the previously known arrangements, the frequency converters are arranged separately from the electrical machines and connected with same via multi-phase power cables.

An example of such a configuration of a power electronics for an electrical machine is described in DE 42 30 510 A1. Herein, the concept is followed to arrange the electronics in a boiling water cooling bath, with the current feed lines, the control signals for the control electronics, etc. being routed to this pressure-tight encapsulated arrangement via a central opening in the bottom of the capsule.

Primarily, the cabling expenditure and the electromagnetic shielding which becomes necessary because of the cables between the electrical machine and the frequency converter are problematic. Moreover, a considerable amount of power connectors both on the side of the frequency converter and the side of the electrical machine is needed. Cooling of the power electronics of the frequency converter also requires a significant expenditure. Another problem is that the repair of such an encapsulated frequency converter is virtually impossible without opening the pressure-tight capsule. Sealing the capsule can only be effected with considerable expenditure. Consequently, even minor defects of the encapsulated frequency converter result in its replacement in its entirety.

The inventive solution pursues the approach to integrate the electrical machine(s) or its/their stator(s) and the actuation electronics on a common carrier and to cool them by means of a common cooling means. In other words, a load bearing cooling jacket is provided which is capable to accommodate the stators and the actuation electronics both at its inner wall and its outer wall. This allows for a considerable saving of space and costs. If a repair might become necessary it is also much easier and less expensive to replace one or more defective modules rather than the actuation electronics in its entirety. In addition, the invention permits to considerably reduce the shielding expenditure against electromagnetic radiated interference because the high frequency power carrying cables are much shorter than in conventional—separate—arrangements. Moreover, the wiring expenditure is considerably reduced because the previously common phase distribution rails on the machine side can be dispensed with.

Advantageous Developments of the Invention

In a preferred embodiment of the invention, the carrier has an essentially hollow cylindrical portion, with one stator being arranged at its inner wall and the other stator being arranged on its outer wall. Alternatively, both stators may be arranged either on its inner wall or on its outer wall. The hollow cylindrical portion of the carrier has an essentially circular or polygonal ring-shaped cross section.

In a preferred embodiment, the cooling means is crisscrossed with fluid channels. These may surround the electrical machine either circularly or spirally or may run essentially coaxially with the axis of rotation of the electrical machine(s) or with the centre axis of the carrier, respectively.

The cooling means can be integrated into the carrier already as early as during its manufacture. This is relatively easy e.g. with a carrier made from pressure die-cast (aluminium) material because the cooling means with its fluid channels may be formed at the wall of the carrier in a simple manner. In one embodiment, the cooling means has at least one opening in its outer wall, which extends to at least one of the fluid channels and into which cooling elements arranged at one of the modules of the electronic control circuit protrude. These cooling elements may, for example, be designed in the shape of ribs, webs, or pins.

In order to improve the heat dissipation both from the electrical machine and the modules of the electronic control circuit, the cooling elements protruding into the fluid channels are designed in such a manner that they cause a turbulent flow in the fluid flowing in the fluid channels. This is effected, for example, by means of impact blades arranged transversely to the fluid stream, guide vanes oriented towards each other or away from one another, or the like.

To achieve a good electrical insulation and simultaneously a good thermal coupling of the power semiconductors (MOSFETs, IGBTS, Schottky diodes, etc.) disposed in the modules of the electronic control circuit the cooling elements protruding into the fluid channels and/or the covers of the modules are made from non-ferrous metal, preferably from material containing copper or aluminium, or from ceramic material, preferably material containing alumina, aluminium nitride, and/or silicon carbide.

In order to connect the components of the electronic control circuit, which are located in the modules with the stator and/or rotor coils over distances as short as possible, essentially radially oriented cables are arranged in the carrier which extend from the stator and/or rotor coils to the respective modules of the electronic control circuit.

Moreover, cables are arranged in the or at the carrier, which are oriented essentially along the circumference, and connect the respective modules of the electronic control circuit with one another. This allows the distribution of control signals, on the one hand, and of the required electrical power, on the other hand, to the modules (in motor operation) or the pick-off from the individual modules (in generator operation).

The carrier may also accommodate a hydraulic manifold plate at its inner wall and/or its outer wall, in particular for the automatic transmission or other hydraulically operated assemblies in the drive train.

Further advantages and developments of the invention will become apparent from the dependent claims and from the embodiments described in the following in principle with reference to the drawing.

BRIEF DESCRIPTION OF THE DRAWINGS

FIG. 3 is a schematic partial illustration in a longitudinal section of an inventive hybrid drive of a first embodiment.

FIG. 4 is a schematic partial illustration in a longitudinal section of an inventive hybrid drive of a second embodiment.

DETAILED DESCRIPTION OF CURRENTLY PREFERRED EMBODIMENTS

Figure 1:
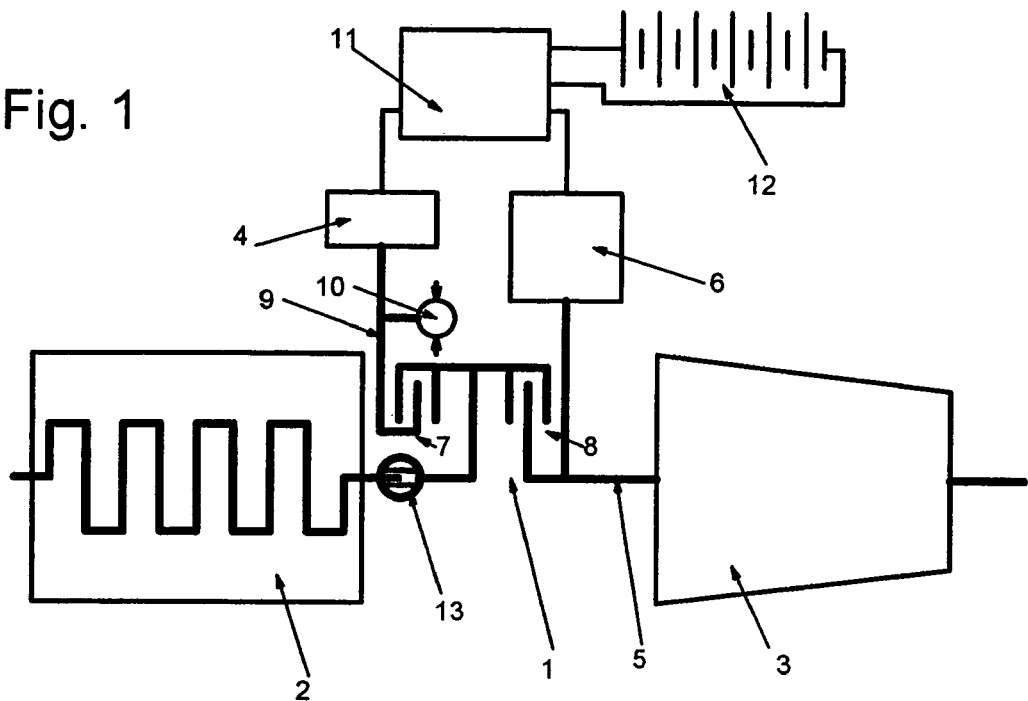
FIG. 1 is a schematic illustration of a parallel hybrid drive for a motor vehicle.
Figure 2:
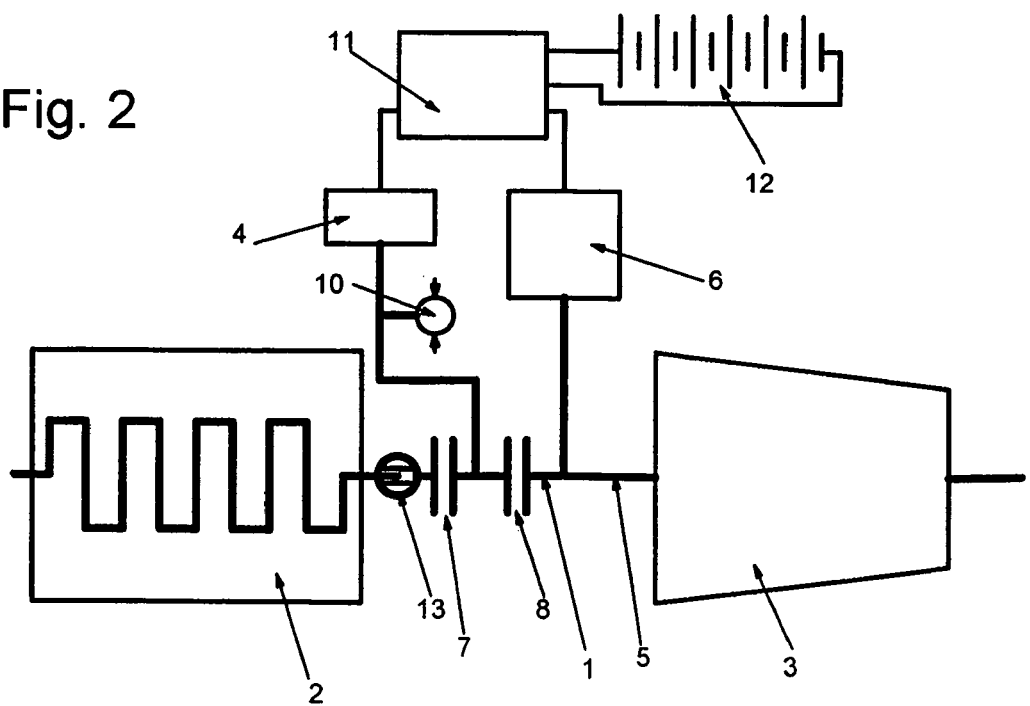
FIG. 2 is a schematic illustration of a serial hybrid drive for a motor vehicle.

FIGS. 1 and 2 schematically show a hybrid drive for a motor vehicle with a drive train 1, which comprises a first electrical machine 4 and a second electrical machine 6 which is directly and permanently connected with a transmission input shaft 5, between a combustion engine 2 and a multi-gear vehicle transmission 3 in the form of an automatic transmission. Between the electrical machines 4 and 6, each of which is capable of being operated as a motor and a generator, and the combustion engine 2 a shiftable clutch 7 or 8, respectively, is arranged.

In the embodiment according to FIG. 1 the first shiftable clutch 7 and the first electrical machine 4 are arranged in a parallel side train 9 which branches off the drive train 1 between the combustion engine 2 and the second shiftable clutch 8 and form a parallel hybrid drive. The first electrical machine 4 is therefore disengaged or engaged, respectively, from the or with the, respectively, combustion engine 2 by the first clutch 7 and the second electrical machine 6 by the second clutch 8.

In the embodiment according to FIG. 2 which shows a serial hybrid drive, the first shiftable clutch 7 and the first electrical machine 4, followed by the second shiftable clutch 8 and the second electrical machine 6 are arranged in series in the drive train 1 from the combustion engine 2 downstream towards the vehicle transmission 3.

In both embodiments, the first electrical machine 4 is provided for starting the combustion engine 2. In this process, the first clutch 7 is closed or slips. In principle, however, the starter function can be effected by the two electrical machines 4 and 6.

The second electrical machine 6 primarily serves for the electric starting with the combustion engine 2 disengaged. Starting is however also possible with the second electrical machine 6 and the connected running combustion engine 2. Here, the second clutch 8 is shifted in the slipping condition.

In the two illustrated embodiments the first electrical machine 4 is directly connected with a hydraulic pump 10 of the automatic transmission 3. The hydraulic pump 10 is arranged between the first shiftable clutch 7 and the first electrical machine 4. It is electrically driven by the first electrical machine 4, or mechanically driven by the combustion engine 2 via the closed first clutch 7.

As can be seen from FIGS. 1 and 2 the electrical machines 4, 6 are electrically connected with each other via a power actuation control 11 and with an electric energy source 12 in the form of a rechargeable battery.

The first electrical machine 4 may be operated with current from the battery 12 or via the power actuation control 11 with current from the second electrical machine 6. In the latter case, the second electrical machine 6 operates as a generator, and the second clutch 8 is shifted to the opened or slipping condition.

As an alternative, the first electric machine 4 can also be operated as a generator, with the second clutch 8 being shifted to the closed or slipping condition.

A torsional vibration damper 13 for protecting the drive train 1 against rotational irregularities is arranged between the output shaft of the combustion engine 2 and the first clutch 7.

FIG. 3 illustrates how the two electrical machines 4, 6 are arranged in a common housing 20 which has an essentially conical tubular shape. An aluminium pressure die-cast tube with a round cross section is inserted into this housing 20 as a carrier 22 whose inner wall 24 has a circular cross section and whose outer wall 26 has a polygonal cross section. At its front (in FIG. 3 right-hand) end the carrier 22 has a supporting flange 28 extending radially inwards which bears against a shaft 32 via a bearing 30. On the outer wall at the front end of the carrier 22 a stator 34 with indicated stator windings 34a of the first electrical machine 4 is arranged secured against rotation. Separated by an air gap 37 a rotor 38 also with indicated rotor windings 38a rotates about the stator 34 of the first electrical machine 4. The output side of the rotor 38 to the first clutch 7 is not detailed herein.

At the side of the first electrical machine 4 facing away from the front end, a further (second) supporting flange 40 extends from the outer wall 26 of the carrier 22 radially outwards, which is secured at the inner wall of the housing 20. At the rear end of the carrier 22 a third supporting flange 42 is formed which also extends radially outward to the inner wall of the housing 20 and is secured thereon.

The second electrical machine 6 is accommodated at the inner wall 24 of the carrier 22 virtually over its entire length. The stator 44 of the second electrical machine 6 with indicated stator windings 44a is attached secured against rotation at the inner wall 24 of the carrier 22. Separated by an air gap 46 a rotor 48 also with indicated rotor windings 48a rotates about the stator 44 of the second electrical machine 6. The output side of the rotor 48 to the second clutch 8 is not shown herein.

The electronic control circuit with several modules 36 distributed along the circumference is arranged between the second and the third supporting flange 40 and 42 at the outer wall 26 of the carrier 22. The stator windings 34a, 44a of the electrical machines are connected via cables 62 with the modules 36 of the electronic control circuit.

Cooling channels 52 are formed in the carrier 22, in which water or oil is circulating which dissipates the thermal energy from the electrical machines 2, 4, in particular from their stators 34 and from the modules, in a heat exchanger not shown in detail to the environment.

In the embodiment shown in FIG. 3 the cooling channels 52 are routed essentially concentrically or spirally and are closed towards the outer wall 26 of the carrier 22. Thermal coupling between the modules 36 of the electronic control circuit and the carrier 22 is effected here by electrically insulated, but thermally conductive plane bottom plate 36a of the modules 36.

In its configuration shown in FIG. 4 the carrier 22 has several openings 54 in its polygonal outer wall 26 with plane area portions, through which cooling elements 58 of the modules 36 of an electronic control circuit are protruding. The cooling elements 58 are designed in such a manner that they cause a turbulent flow in the water or oil flowing in the cooling channels 32 in order to enhance the heat dissipation from the modules 36 of the electronic control circuit and from the electrical machines 4, 6.

Incidentally, the embodiments of FIGS. 3 and 4 differ from each other in that in FIG. 3 at the outer wall of the carrier 22 one electrical machine as external rotor motor and the electronic control circuit is arranged, while at the inner wall of the carrier 22 the other electrical machine as internal rotor motor is arranged. In FIG. 4, however, only the electronic control circuit is arranged on the outer wall of the carrier, and the two electrical machines are arranged as internal rotor motors at the inner wall of the carrier. FIG. 4 also shows how a hydraulic manifold plate 70 between the two electrical machines (or also at one of the outer faces of the respective machine) at the inner wall 26 of the carrier 22 may extend radially inwards. The hydraulic manifold plate 70 may therefore, if required, also take the function of the first supporting flange 28 extending radially inwards.

The modules 36 of the electronic control circuit have a shape which is essentially adapted to the available space and comprise electronics including power semiconductors 36b. The power semiconductors 36b generating heat losses are thermally coupled with the cooling elements 58.

The bottom plates 36a of the modules 36 and the cooling elements 58 are made from material containing copper or aluminium, from alumina, aluminium nitride or silicon carbide.

Finally, it should be noted that the drawings serve to illustrate and explain the invention only in principle; the actual dimensions and proportions of embodiments of the invention may differ therefrom.

The invention claimed is:

1. A hybrid drive for a motor vehicle with a drive train (1), comprising
a combustion engine (2) and a vehicle transmission (3) with variable gear ratio and
first and second electrical machines (4,6) each of which can be operated both as a motor and a generator, each of which comprises a stator (34, 44) and a rotor (38, 48), with
the second electrical machine (6) being in a permanent nonpositive connection with an input (5) of the vehicle transmission,
first and second shiftable clutches (7, 8) each arranged between the electrical machines (4, 6) and the drive shaft of the combustion engine (2), and with
the electrical machines (4, 6) connected with each other and also connectable with an electrical energy source (12) via a power actuation control (11), with
the two electrical machines (4, 6) arranged in a common housing (20), wherein
the two stators (34, 44) of the electrical machines (4, 6) and the power actuation control (11) are accommodated along a circumference of a common carrier (22) which comprises a cooler (52) integrally formed in the common carrier for cooling the stators (34, 44) and the power actuation control (11).

2. The hybrid drive for a motor vehicle according to claim 1,
characterized in that the carrier (22) has an essentially hollow cylindrical portion, with the one stator being arranged at its inner wall (24) and the other stator being arranged at its outer wall (26).

3. The hybrid drive for a motor vehicle according to claim 2,
characterized in that the hollow cylindrical portion of the carrier (22) has a cross section that is one of circular and polygonal ring-shaped cross section.

4. The hybrid drive for a motor vehicle according to claim 1,
characterized in that both stators are arranged either at the inner wall or at the outer wall of the common carrier (22).

5. The hybrid drive for a motor vehicle according to claim 1,
characterized in that the carrier (22) accommodates a hydraulic manifold plate (70) at its inner wall (24) and/or its outer wall (26).

6. The hybrid drive for a motor vehicle according to claim 1,
characterized in that the first shiftable clutch (7) and the first electrical machine (4) and the second shiftable clutch (8) and the second electrical machine (6) are arranged in series in the drive train (1) between the combustion engine (2) and the vehicle transmission (3).

7. The hybrid drive for a motor vehicle according to claim 1,
characterized in that the first shiftable clutch (7) and the first electrical machine (4) are arranged in a parallel side train (9) which branches off the drive train (1) between the combustion engine (2) and the second shiftable clutch (8) in such a manner, that the first electrical machine (4) can be disengaged from the combustion engine (2) by the first clutch (7) and the second electrical machine (6) by the second clutch (8).

8. The hybrid drive for a motor vehicle according to claim 1,
characterized in that the first electrical machine(4) is connected with a hydraulic pump (10) of the vehicle transmission (3).

9. The hybrid drive for a motor vehicle according to claim 1,
characterized in that the first electrical machine (4) is connected with at least one of several auxiliary units of the motor vehicle for driving said at least one of several auxiliary units.

10. The hybrid drive for a motor vehicle according to claim 1,
characterized in that the second electrical machine (6) has a higher power consumption/output than the first electrical machine (4).

11. The hybrid drive for a motor vehicle according to claim 1,
characterized in that the vehicle transmission is an automatic transmission (3).

12. The hybrid drive for a motor vehicle according to claim 1,
characterized in that the power actuation control (11) is divided into several modules (36) each of which being electrically connected with at least one of: a) the stator and b) the rotor coils (22, 24), with the modules (36) being arranged distributed at the circumference of the electrical machine and coupled with the cooler (52) of the carrier (22) in a thermally conductive manner.

13. The hybrid drive for a motor vehicle according to claim 12,
characterized in that the modules (36) of the power actuation control (11) are radially arranged at the outside of the cooler (52).

14. The hybrid drive for a motor vehicle according to claim 1,
characterized in that the cooling means is formed by fluid channels (32) crisscrossing the carrier (22).

15. The hybrid drive for a motor vehicle according to claim 1,
characterized in that the carrier (22) comprises at least one opening (54) to at least one of the fluid channels (52), into which cooling elements (58) protrude which are arranged at one of the modules (36) of the electronic control circuit.

16. The hybrid drive for a motor vehicle according to claim 1,
characterized in that the cooling elements (58) protruding into the fluid channels (52) and/or the wall of the fluid channels (52) ae designated in such a manner that they cause a turbulent flow in the fluid flowing in the fluid channels (52).

\* \* \* \* \*

UNITED STATES PATENT AND TRADEMARK OFFICE
CERTIFICATE OF CORRECTION

PATENT NO. : 7,637,333 B2 Page 1 of 1
APPLICATION NO. : 10/531371
DATED : December 29, 2009
INVENTOR(S) : Gründl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Ninth Day of November, 2010

David J. Kappos
*Director of the United States Patent and Trademark Office*